United States Patent [19]
Shindo et al.

[11] Patent Number: 5,317,414
[45] Date of Patent: May 31, 1994

[54] DROP OUT COMPENSATION CIRCUIT

[75] Inventors: Yoshitaka Shindo, Daito; Fukuji Anzai, Chiyoda, both of Japan

[73] Assignee: Sanyo Electric Co., Ltd., Japan

[21] Appl. No.: 569

[22] Filed: Jan. 4, 1993

Related U.S. Application Data

[63] Continuation of Ser. No. 523,745, May 15, 1990, abandoned.

[30] Foreign Application Priority Data

May 19, 1989 [JP] Japan ............................ 1-127328
Jul. 17, 1989 [JP] Japan ............................ 1-183980

[51] Int. Cl.⁵ .................................................. H04N 5/94
[52] U.S. Cl. ...................................... 358/336; 358/314; 358/340; 360/38.1
[58] Field of Search ................ 358/314, 336, 340, 167, 358/335, 310; 360/38.1; H04N 5/94, 9/88

[56] References Cited

U.S. PATENT DOCUMENTS

| | | | |
|---|---|---|---|
| 4,158,855 | 6/1979 | Thomas et al. | 358/127 |
| 4,403,262 | 9/1983 | Ito et al. | 360/38.1 |
| 4,731,675 | 3/1988 | Tachibana ewt al. | 358/336 |
| 4,815,061 | 3/1989 | Yasamura et al. | 358/336 |
| 4,893,192 | 1/1990 | Takemura | 358/336 |

FOREIGN PATENT DOCUMENTS

| | | | |
|---|---|---|---|
| 0283281 | 9/1988 | European Pat. Off. | H04N 5/94 |
| 2410406 | 6/1979 | France | H04N 5/94 |
| 58-222682 | 12/1983 | Japan | |

*Primary Examiner*—Tommy P. Chin
*Assistant Examiner*—Huy Nguyen
*Attorney, Agent, or Firm*—Peter L. Michaelson

[57] ABSTRACT

A drop out compensation circuit for resolving the unnaturalness of the pictorial image due to a long period drop out compensation is disclosed. This drop out compensation circuit comprises a drop out detecting circuit, a delay circuit for delaying a drop out detected output, and a circuit for limiting the drop out compensation to the delay time period by the delay circuit in response to the drop out detected output and the delay signal of the delay circuit. Accordingly, the drop out compensation is performed only within a range wherein it is visually natural, so that unnatural pictorial image does not appear.

15 Claims, 4 Drawing Sheets

DROP OUT COMPENSATION CIRCUIT

CROSS REFERENCE TO RELATED APPLICATION

This application is a continuation of our co-pending United States patent application entitled "DROP OUT COMPENSATION CIRCUIT INCLUDING COMPENSATION PERIOD LIMITING CIRCUITRY" filed May 15, 1990, Ser. No. 07/523,745, now abandoned.

BACKGROUND OF THE INVENTION

1. Field of the Invention

The present invention relates to a video signal playback system such as a video tape recorder and a video disc player, and more particularly, to a drop out compensation circuit to compensate for portions of decreased amplitude in video signals from a video head.

2. Description of the Background Art

Generally, a drop out compensation circuit envelope-detects the frequency modulation reproduced output from a video head, detects a portion where the envelope detected output is lower than a predetermined level, and compensates the low level portion with the FM reproduced output in an immediately previous horizontal 1H period. 1H The video signal has line correlativity and the gap of one horizontal period appearing on a screen has no effect on the human vision.

Such method of detecting a decrease in the envelope level, however, responds to a level decrease of a long duration such as a level decrease during high speed playback and a level decrease during the first half or the latter half of a field due to poor contact between a tape and a head. Therefore, when the drop out compensation is performed by a drop out compensation circuit employing a 1H delay circuit, as image signals for 1H are used repeatedly during the level decrease period, the pictorial image becomes rather unnatural.

SUMMARY OF THE INVENTION

It is an object of this invention to provide a drop out compensation circuit which can resolve the unnaturalness of the pictorial image due to the drop out compensation.

It is another object of this invention to provide a drop out compensation circuit which does not perform the drop out compensation longer than a predetermined period.

It is yet another object of this invention not to vary the longest time period for performing the drop out compensation in a drop out compensation circuit.

Briefly stated, a drop out compensation circuit in accordance with this invention comprises an envelope detecting circuit for envelope-detecting a reproduced output from a video head, a drop out detecting circuit for detecting a level decrease of an envelope detected output, a delay circuit for delaying the detected output of the drop out detecting circuit by a predetermined time period, a compensation period setting circuit, supplied with the output of the delay circuit and the detected output of the drop out detectioning circuit as inputs, for setting a drop out compensation period in response to the detected output within the above predetermined time period, a one-horizontal-period delay circuit for delaying the reproduced output by one horizontal period, and a selecting circuit for selecting a one-horizontal-period-delayed reproduced output in response to the output of the compensation period setting circuit.

In operation, the reproduced output from the video head is detected by the envelope detecting circuit. A level decreased within the envelope-detected output is detected by the drop out detecting circuit. The drop out detected output is provided to the compensation period setting circuit after being delayed by a predetermined time period by the delay circuit.

The compensation period setting circuit, in the case where the drop out detected output lasts longer than a predetermined period, does not provide signals for causing the drop out compensation to the video signal delay circuit.

Accordingly, if a drop out condition lasts longer than a predetermined time period, the drop out compensation is not performed, so that the unnaturalness of the pictorial image due to a long time drop out compensation can be avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
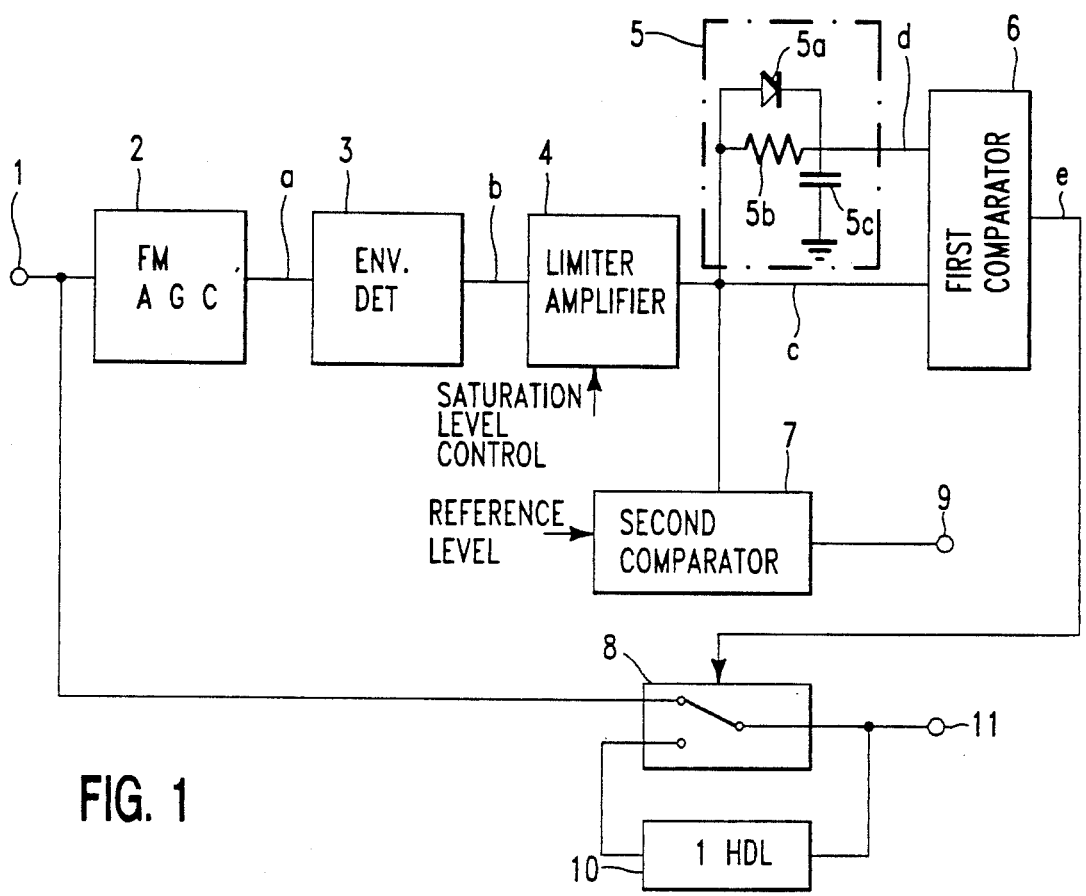
FIG. 1 is a block diagram showing one embodiment of a drop out compensation circuit of this invention.

FIG. 1 is a block diagram showing one embodiment of a drop out compensation circuit in accordance with this invention.

Referring to the figure, a frequency modulation (FM) reproduced output is provided to an input terminal 1 from a video head. An FM automatic gain control (FMAGC) circuit 2 controls a gain to make the envelope level of the reproduced output flat. An envelope detection circuit 3 envelope-detects an FM reproduced output thereby producing a detection output signal of a level corresponding to the amplitude of the FM reproduction output. A limiter amplifier 4 (drop out detecting means) is a DC amplifier provided with an amplitude limiting function, which limits the envelope detected output to a fixed level. This limiter amplifier 4 has input/output characteristics shown in FIG. 2. When it is presumed that the average envelope level after the automatic gain control is 100%, upon reception having a input of level higher than about 25%, the limiter is saturated and a H level is provided as an output signal. In the case of an input level lower than about 25%, an output proportional to the input is obtained.

Referring back to FIG. 1, a delay circuit 5 has a function for delaying the fall of the output of the limiter amplifier 4 within a range not exceeding 20 horizontal periods (20H). Specifically, it comprises an integrating circuit composed of a capacitor 5c and a resistor 5b, and a diode 5a connected to the resistor 5b in parallel, which provides a time constant determined by the resistor 5b and the capacitor 5c upon the falling of the output of the limiter amplifier 4, and upon its rising, transmits the change quickly. As the maximum delay period 20H is a period determined in consideration of disorder of the pictorial image due to the drop out compensation in one field, it is not limited to 20H. A first comparator 6 (compensation period setting means) compares the output of the limiter amplifier 4 and the output of the delay circuit 5, and only when the level of the latter is higher than that of the former, it provides a H level to a switch circuit 8.

A one-horizontal-period delay circuit 10 referred to as "a 1H delay circuit" hereinafter) delays the FM reproduced output from the video head by one horizontal period (1H).

The switch circuit 8 is responsive to the output of the first comparator 6 to switch and connect the input side thereof to the input terminal 1 or the 1H delay circuit 10.

A second comparator 7, which forms no part of the present invention, detects absence of FM reproduced output and provides a no-signal detected signal to an output terminal 9.

The operation of the drop out compensation circuit in the above FIG. 1 will be described with reference to FIGS. 3 and 4.

Figure 3:
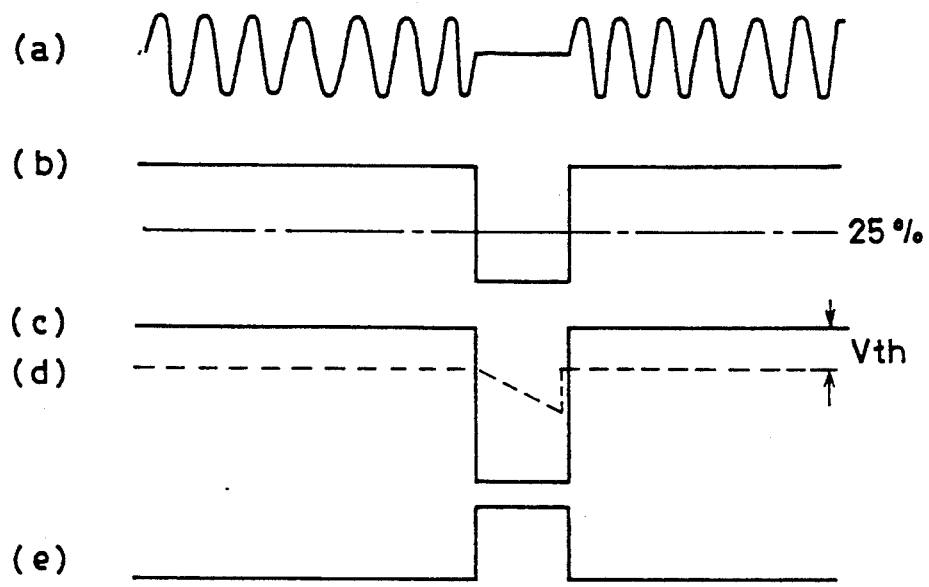
FIGS. 3 and 4 are waveform diagrams of waves of respective parts of the drop out compensation circuit shown in FIG. 1.
Figure 4:
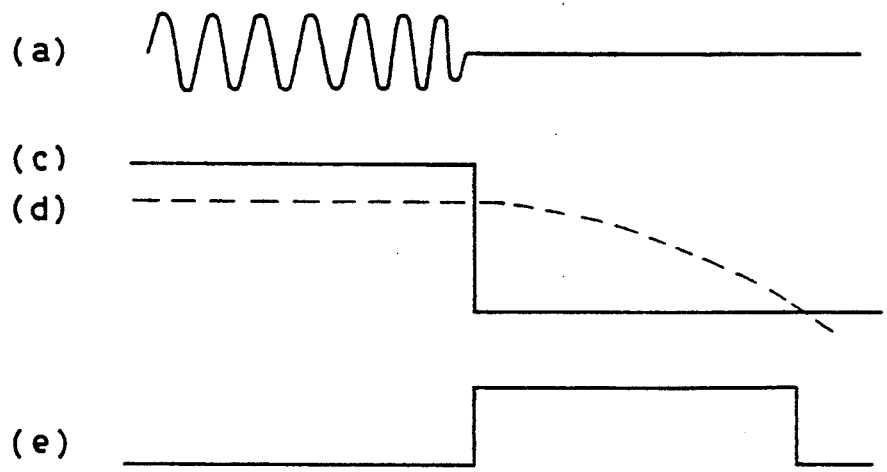

In FIGS. 3 and 4, time is illustrated on the axis of abscissa and voltage is on the axis of ordinate FIG. 3 shows a case where the drop out period is shorter than the maximum delay time, and FIG. 4 shows a case where the drop out period is longer than the maximum delay time. FIGS. 3(a) and 4(a) are of a FM reproduced output of the input terminal 1, FIG. 3(b) is of the envelope detection signal, FIGS. 3(c) and 4(c) are of the drop out detection signal, FIGS. 3(d) and 4(d) are of the output signal of the delay circuit 5, and FIGS. 3(e) and 4(e) are of the output signal e of the first comparator.

In case of a drop out of a relatively short period due to dust on a tape or the like, the output c of the limiter amplifier 4 varies as shown by the solid line in FIG. 3(c). The output d of the delay circuit 5 varies accordingly, as shown by the broken line. Thus, the output e of the first comparator becomes a control signal (high level) for causing the drop out compensation as shown in FIG. 3(e). This high level control signal e is provided to the switch circuit 8, and the switch circuit 8, in response to this, provides an 1H delay signal from the 1H delay circuit 10 through the output terminal 11 to an image circuit (not shown). The reduced amplitude portion of video signal is compensated by this 1H delay signal.

On the other hand, in case having an output decrease of a long period such as a noise bar in high speed playback (e.g., quintuplicated speed), the output c of the limiter amplifier 4 and the output d of the delay circuit 5 vary as shown by the solid line in FIG. 4(c) and the broken line in FIG. 4(d), respectively. Accordingly, the output e of the first comparator 6 varies as shown in FIG. 4(e), and even if the level decrease period is long, the duration of the drop out compensation is limited by the maximum delay period determined by the time constant of the delay circuit 5.

That is to say, the limiter amplifier 4 by causes the envelope detected output b to vary in its state between two values, H level and L level. Thus the operation of the first comparator 6 is stable even though the level of the envelope detected output may vary. Alternatively, since the envelope detected output b is to be binary of high level and low level as described above, a comparator can be used instead of the limiter amplifier 4.

Figure 2:
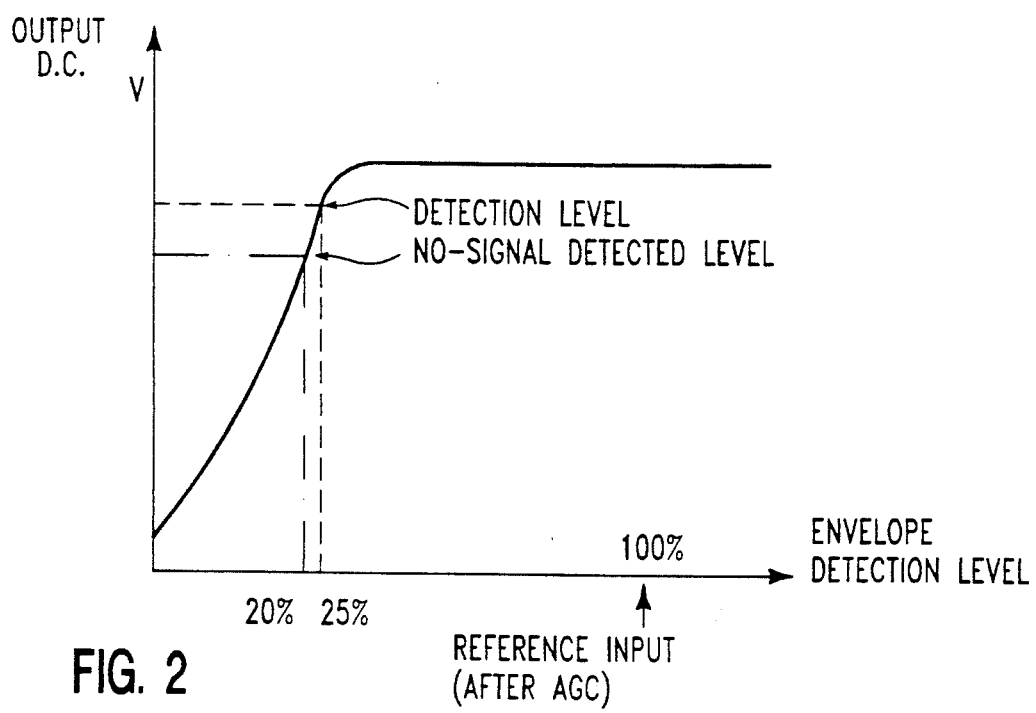
FIG. 2 is a characteristics diagram of a limiter amplifier.

The second comparator 7 shown in FIG. 2 is provided with a reference voltage level as shown in FIG. 2, and when the output c of the limiter amplifier 4 is lower than this level, it provides a H level. Thus, by integrating the output of the second comparator and discriminating the level of the integrated value, presence or absence of the image signal can be determined. A screen upon which the video signal is displayed is made entirely black based on the no-signal determination output.

While the length of the period for the drop out compensation is determined by the input level to the delay circuit 5 and the time constant of the delay circuit 5, it is decided to be about 20 horizontal periods in the present embodiment in consideration of the image disorder as described above.

According to the invention described above, a drop out compensation circuit can be realized which limits the compensation period to a duration less than that which is expected in connection with long duration drop outs resulting from high speed playback or the like.

Figure 5:
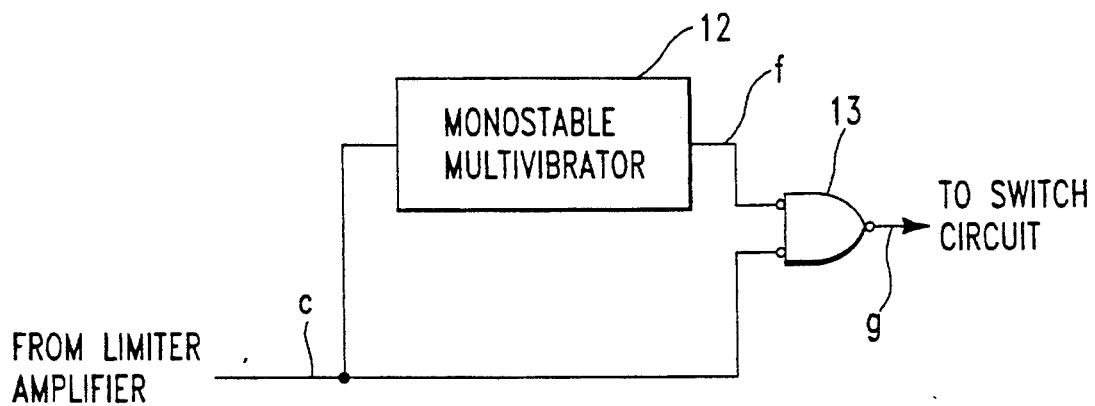
FIG. 5 is a block diagram showing another embodiment of this invention.

FIG. 5 is a block diagram showing a modification of the delay circuit 5 and the first comparator in the above FIG. 1.

Referring to the figure, the difference from FIG. 1 is that it employs a monostable multivibrator 12 as a delay circuit 5, and an OR circuit 13 instead of the first comparator.

The operation of the drop out compensation circuit in the above FIG. 5 will be described in reference with the waveform diagram of the FIG. 6. The (c1) and (c2) signals are each an output c of the limiter amplifier, (f) is an output f of the monostable multivibrator 12 and the (g1) and (g2) are the output g of the OR circuit 13.

The drop out detected output c of the limiter amplifier 4 is not only provided to the OR circuit 13 directly, but also is provided to the OR circuit 13 after being delayed by 20H periods by monostable multivibrator 12.

Figure 6:
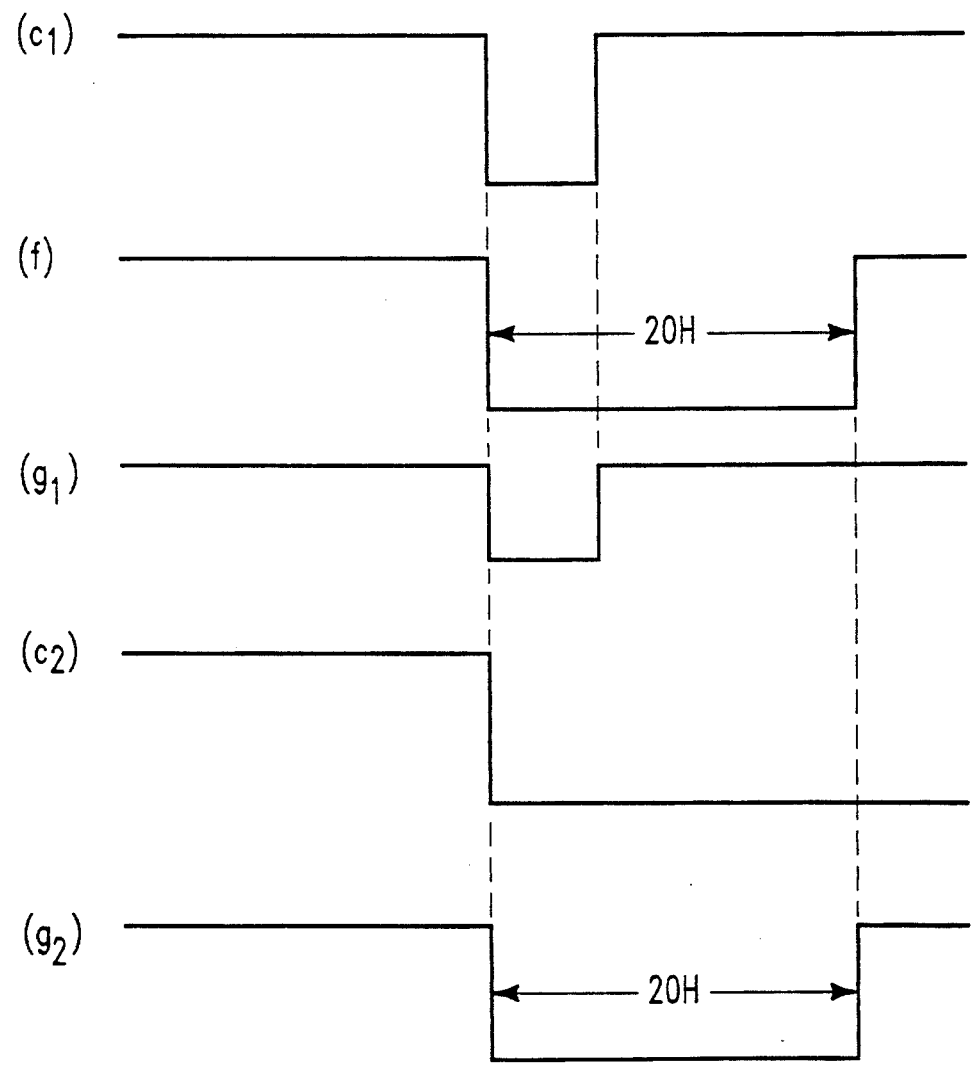
FIG. 6 is a waveform diagram of waves of respective parts of a drop out compensation circuit of the above FIG. 5.

When the low level period of the drop out detected output c is shorter than the low level period of the delay signal f (20H), the signal itself becomes a control signal g for the drop out compensation during the drop out detection period (refer to FIGS. 6(c1), (f), and (g1)).

In the contrast, when the low level period of the drop out detected output c is longer than the low level period of the delay signal f (20H), the delay signal f (low level) becomes a control signal g in its output period (refer to FIG. 6 (c2), (f), (g2)).

Accordingly, when the drop out period is longer than 20H, the drop out compensation is stopped.

Figure 7:
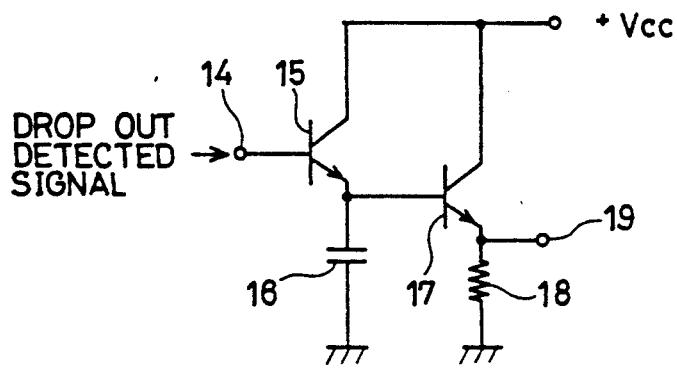
FIGS. 7 and 8 are circuit diagrams showing modifications of delay circuits, respectively.

FIG. 7 is a circuit diagram showing a modification of a delay circuit. Referring to the figure, upon application of a drop out detected signal to an input terminal 14, a capacitor 16 is charged by an input transistor 15 in accordance with said signal, and charged voltage is provided to an output terminal 19 through an output transistor 17. The discharging current of said capacitor 16 flows to the base of the output transistor 17, so that the time constant can be changed by the base current of said output transistor 17. Accordingly, by employing the circuit of FIG. 7, the pulse width of the drop out detected pulse can be changed.

Figure 8:
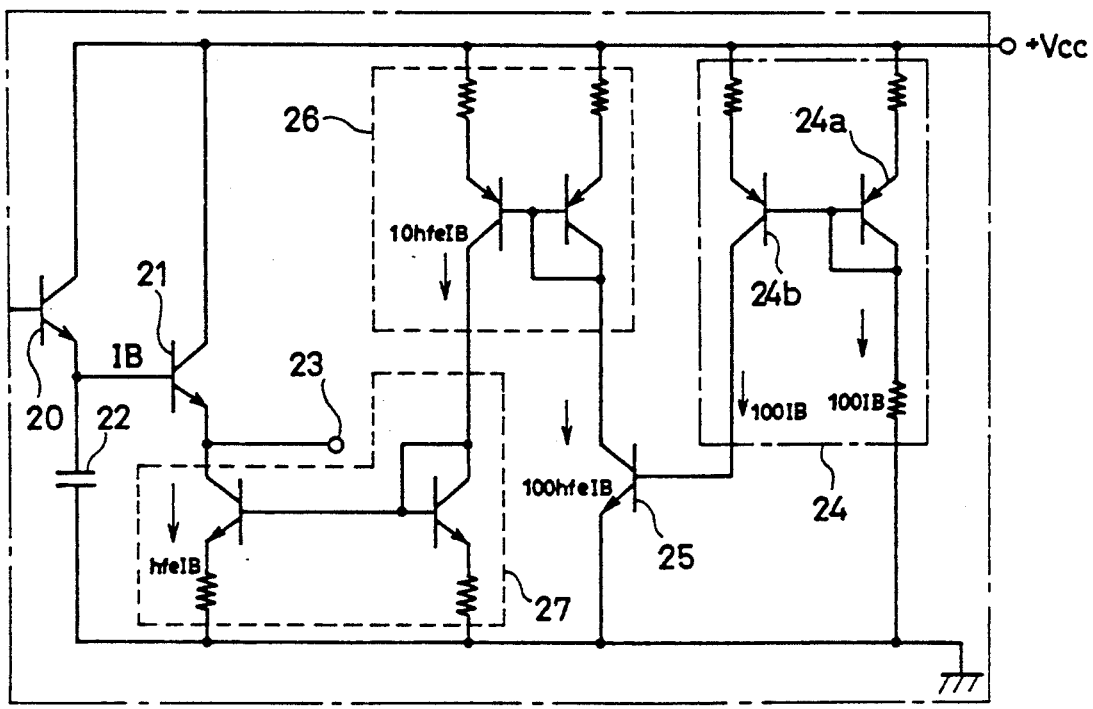

FIG. 8 is a circuit diagram of an improved delay circuit of the above FIG. 7.

Generally, hfe (current amplification factor) of a transistor will vary depending upon surrounding environmental characteristics. The amount of variation is generally due to manufacturing processes or the like. The variation in $h_{fe}$ is especially prominent for integrated circuits (IC). In fact, under some environmental characteristics the value can be doubled in some cases. Referring to FIG. 7, the delay circuit has a problem in that change in $h_{fe}$ of the output transistor 17 varies to vary the base current value, and the discharge time varies accordingly.

Referring to FIG. 8, the input transistor 20 is provided with the drop out detected signal from an input terminal 19. A first transistor 21 is provided with the discharge current at the base thereof from a capacitor 22, and provides a delay signal from an output terminal 23 connected to the emitter thereof. A constant-current source 24 is a current mirror circuit comprising transistors 24a and 24b. A second transistor 25 has its base connected to said constant-current source 24 and its collector connected to a first current mirror circuit 26. The current ratio of the input side and the output side of the first current mirror circuit 26 is 10:1. A second current mirror circuit 27 has its input connected to the output of said first current mirror circuit 26 and its output connected to the emitter of said first transistor 21, and the current ratio of the input side and the output side is set to be 10:1.

Next, the operation will be described. When setting the current flowing to the transistor 24a of the constant-current source to be $100I_B$, the current which is equal to the current $100I_B$ flows to the transistor 24b and is provided to the base of the second transistor 25. Then, the collector current of the second transistor 25 becomes $100 hfe\ I_B$, and the collector current is inverted by the first current mirror circuit 26 to become $10h_{fe}\ I_B$, and provided to the input of the second current mirror circuit 27. Also, the current of $10h_{fe}\ I_B$ is inverted to become hfe $I_B$ and the current hfe $I_B$ flows to the output. The base current of the first transistor 21 at this time is of a value found by dividing the emitter current of the first transistor 21 (hfe $I_B$) by the hfe of the first transistor 21, that is, $I_B$.

Accordingly, the base current of the first transistor 21 is not affected by the variation of the $h_{fe}$ of that transistor, and can be determined according to the current value of the constant-current source 24. Thus, it is possible to take the output current of the second transistor 25, having the same variation ratio as that of the hfe of the first transistor 21, as the emitter current. Therefore even if the hfe of the first transistor 21 varies, its emitter current varies in the same direction and the base current can be maintained at a predetermined value. Upon manufacturing as ICs, transistors formed in a chip generally have equal variation ratios. Therefore, the circuit of FIG. 8 is especially suitable for manufactured as an IC.

Next, a specific circuit constant of a drop out compensation DOC circuit will be described. The longest operation time of a drop out circuit is set around 20H (H is one horizontal period), which is about 1.27 msec in time. In FIG. 8, in consideration of manufacturing thereof as an IC, when the maximum voltage of the output terminal 23 is presumed to be 2 volts and the capacitance of the capacitor 22 to be 50 pF, the discharge current I is found as follows:

$$I = CV/T = 50 \times 10^{-12} \times 2/1.27 \times 10^{-3} = 80\ nA$$

where;
C = capacitance of the capacitor 11,
V = the maximum voltage of the output terminal 23,
T = time until the discharge is completed.

To realize the discharge current in a circuit of FIG. 8, the current flowing to the constant-current source 24 should be set at 8 μA.

As described above, according to the embodiment of FIG. 8, when employing the base current of the transistor as the discharge current of the charged capacitor, the value of said base current can be maintained unchanged regardless of the variation of hfe of the transistor. Therefore, even when the drop out compensation circuit is fabricated as an IC, the most suitable drop out compensation operation time can be set.

The delay circuit of the embodiment of FIG. 8 can set the delay time precisely in response to the pulse signal, and can be applied to a variety of circuits which require delay signals other than said drop out compensation circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a video signal reproducing apparatus for reproducing video signals previously recorded in a recording medium wherein said apparatus has a video head, a drop out compensation circuit for compensating for portions of decreased amplitude in a reproduced output video signal produced from the video head, said circuit comprising:

means for envelope-detecting said reproduced output video signal from the video head and for producing a detected output signal having a level corresponding to an amplitude of said reproduced output video signal, means for producing a drop out detection signal by comparing the level of said detected output signal with a predetermined level, said drop out detection signal having a pulse width substantially equivalent to a duration of a level change of said detected output signal, first means for delaying the drop out detection signal by a prescribed time period and producing a pulse signal, said pulse signal having a pulse width commencing with a leading edge of said drop out detection signal and terminating after said prescribed time period, means, responsive to said drop out detection signal and said pulse signal, for producing a drop out compensation period signal by comparing the pulse width of said drop out detection signal with the pulse width of said pulse signal, said drop out compensation period signal having first and second states and a duration equivalent to the shorter of either the pulse width of the drop out detection signal or the pulse width of the pulse signal, second means for delaying the reproduced output video signal from the video head by one horizontal period so as to form a one-horizontal period delayed output video signal, and means, connected to said reproduced output video signal and the one-horizontal period delayed output video signal and operative in response to said drop out compensation period signal, for generating, in response to the first and second states of the drop out compensation period signal, a drop out compensated video signal as being either said reproduced output video signal or said one-horizontal period delayed output video signal, respectively.

2. The drop out compensation circuit according to claim 1 wherein said first delaying means comprises means for integrating said drop out detection signal over said prescribed time period and thereby producing said pulse signal.

3. The drop out compensation circuit according to claim 1 wherein said first delaying means comprises a monostable multivibrator for delaying said drop out detection signal for said prescribed time period and thereby producing said pulse signal.

4. The drop out compensation circuit according to claim 1 wherein said first delaying means comprises:
 a constant-current source for producing a constant current,
 a capacitor for establishing said prescribed time period and provided with the drop out detection signal,
 a first transistor having a base provided with a discharge current from said capacitor and having an emitter providing the pulse signal,
 a second transistor having a base provided with said constant-current, and
 a current mirror circuit having an input connected to a collector of said second transistor and having an output connected to the emitter of said first transistor.

5. The drop out compensation circuit according to claim 1, wherein
 said first delaying means is integrated on a semiconductor substrate.

6. The drop out compensation circuit according to claim 4, wherein
 said capacitor, said first transistor and second transistor are formed on a common semiconductor substrate.

7. The drop out compensation circuit according to claim 1, wherein said drop out detection signal producing means comprises a limiter amplifier for amplitude limiting said detected output signal and for providing said drop out detection signal to said first delaying means and to said drop out compensation period signal producing means.

8. The drop output compensation circuit according to claim 1, wherein said drop out compensation period signal producing means comprises a comparator for comparing said pulse signal to said drop out detection signal and for producing said drop out compensation period signal.

9. The drop out compensation circuit according to claim 1, wherein said drop out compensation period signal producing means comprises an OR circuit for logically ORing said pulse signal with said drop out detection signal and for producing said drop out compensation period signal.

10. In a video signal reproducing apparatus for reproducing video signals previously recorded in a recording medium wherein said apparatus has a video head, a drop out compensation circuit for compensating for portions of decreased amplitude in a reproduced output video signal produced from the video head, said circuit comprising:
 means for envelope-detecting said reproduced output video signal from the video head and for producing a detected output signal having a level corresponding to an amplitude of said reproduced output video signal,
 means for producing a drop out detection signal by comparing the level of said detected output signal with a predetermined level, said drop out detection signal having a pulse width substantially equivalent to a duration of a level change of said detected output signal,
 first means for delaying the drop out detection signal by a prescribed time period and producing a pulse signal, said pulse signal having a pulse width commencing with a leading edge of said drop out detection signal and terminating after said prescribed time period, wherein said first delaying means comprises:
 a constant-current source for producing a constant current,
 a capacitor for establishing said prescribed time period and provided with the drop out detection signal,
 a first transistor having a base provided with a discharge current from said capacitor and having an emitter providing the pulse signal,
 a second transistor having a base provided with said constant-current, and
 a current mirror circuit having an input connected to a collector of said second transistor and having an output connected to the emitter of said first transistor;
 means, responsive to said drop out detection signal and said pulse signal, for producing a drop out compensation period signal by comparing the pulse width of said drop out detection signal with the pulse width of said pulse signal, second states and a duration equivalent to the shorter of either the pulse width of the drop out detection signal or the pulse width of the pulse signal,
 second means for delaying the reproduced output video signal from the video head by one horizontal period so as to form a one-horizontal period delayed output video signal, and
 means, connected to said reproduced output video signal and the one-horizontal period delayed output video signal and operative in response to said drop out compensation period signal, for generating, in response to the first and second states of the drop out compensation period signal, a drop out compensated video signal as being either said reproduced output video signal or said one-horizontal period delayed output video signal, respectively.

11. The drop out compensation circuit according to claim 10, wherein said first delaying means is integrated on a semiconductor substrate.

12. The drop out compensation circuit of claim 10, wherein said capacitor, said first transistor and said second transistor are formed on a common substrate.

13. The drop output compensation circuit according to claim 10, wherein said drop out detection signal producing means comprises a limiter amplifier for amplitude limiting said detected output signal and for providing said drop out detection signal to said first delaying means and to said drop out compensation period signal producing means.

14. The drop output compensation circuit according to claim 10, wherein said drop out compensation period signal producing means comprises a comparator for comparing said pulse signal to said drop out detection signal and for producing said drop out compensation period signal.

15. The drop out compensation circuit according to claim 10, wherein said drop out compensation period signal producing means comprises and OR circuit for logically ORing said pulse signal with said drop out detection signal and for producing said drop out compensation period signal.

* * * * *